(12) United States Patent
Taylor et al.

(10) Patent No.: US 9,907,416 B1
(45) Date of Patent: Mar. 6, 2018

(54) DEVICES FOR REMOVABLY MOUNTING AN INTERFACE DEVICE

(71) Applicant: Steven R. Taylor, New River, AZ (US)

(72) Inventors: Steven R. Taylor, New River, AZ (US); Richard Dittmer, Oconomowoc, WI (US); Boyd Dittmer, Mukwonago, WI (US)

(73) Assignee: Steven R. Taylor, New River, AZ (US)

( * ) Notice: Subject to any disclaimer, the term of this patent is extended or adjusted under 35 U.S.C. 154(b) by 0 days.

(21) Appl. No.: 15/608,440

(22) Filed: May 30, 2017

Related U.S. Application Data

(60) Provisional application No. 62/408,175, filed on Oct. 14, 2016, provisional application No. 62/437,801, filed on Dec. 22, 2016.

(51) Int. Cl.
| | | |
|---|---|---|
| *F16M 13/00* | (2006.01) |
| *F16M 11/00* | (2006.01) |
| *A47B 96/06* | (2006.01) |
| *G07F 7/10* | (2006.01) |
| *G06K 7/08* | (2006.01) |
| *A47B 91/00* | (2006.01) |
| *A47F 9/04* | (2006.01) |
| *F16M 13/02* | (2006.01) |
| *F16B 1/00* | (2006.01) |
| *H05K 5/02* | (2006.01) |

(52) U.S. Cl.
CPC .............. *A47F 9/04* (2013.01); *F16B 1/00* (2013.01); *F16M 13/022* (2013.01); *H05K 5/0204* (2013.01); *A47F 2009/041* (2013.01); *F16B 2001/0035* (2013.01); *F16M 2200/02* (2013.01)

(58) Field of Classification Search
CPC .. F16M 13/00; F16M 11/041; F16M 2200/02; F16M 13/022; F16M 11/2014; H05K 5/0204; B62B 9/26
USPC .......... 248/121, 122.1, 274.1, 206.5, 346.03, 248/346.04, 346.06, 346.07, 220.21, 917; 361/683, 686
See application file for complete search history.

(56) References Cited

U.S. PATENT DOCUMENTS

| | | | |
|---|---|---|---|
| 6,539,358 B1 * | 3/2003 | Coon ................. B60R 11/0241 704/251 |
| D614,613 S * | 4/2010 | Kim .......................... D14/253 |

(Continued)

OTHER PUBLICATIONS

"POS Paddle", Tailwind Solutions, Sep. 15, 2009, https://www.youtube.com/watch?v=eTU78TQ8qeA.

*Primary Examiner* — Tan Le
(74) *Attorney, Agent, or Firm* — Andrus Intellectual Property Law, LLP

(57) ABSTRACT

A device configured to removably mount a point of sale terminal. The device includes an anchor portion with a base that is configured to anchor the device. A carriage support member with an upper section and a lower section is connected to the anchor portion. The carriage support member has a first connecting feature. A carriage with an upper side and a lower side is configured to be positioned on the upper section of the carriage support member and is configured to support an interface device operational as a point of sale terminal on the upper side. The carriage has a second connecting feature that is engageable with the first connecting feature of the carriage support member to removably connect the carriage to the carriage support member.

21 Claims, 17 Drawing Sheets

(56) References Cited

U.S. PATENT DOCUMENTS

| | | | |
|---|---|---|---|
| 8,020,816 B2* | 9/2011 | Laitila | F16M 13/00 248/125.9 |
| 8,979,040 B2* | 3/2015 | Chien | F16M 13/00 248/121 |
| 2012/0175474 A1* | 7/2012 | Barnard | F16M 11/041 248/122.1 |
| 2013/0277521 A1* | 10/2013 | Hiramoto | F16M 13/00 248/274.1 |
| 2015/0108317 A1* | 4/2015 | Cruz | B62B 9/245 248/479 |

* cited by examiner

DEVICES FOR REMOVABLY MOUNTING AN INTERFACE DEVICE

CROSS REFERENCE TO RELATED APPLICATIONS

This application claims the benefit of U.S. Provisional Patent Application Nos. 62/408,175 and 62/437,801, filed Oct. 14, 2016 and Dec. 22, 2016, respectively, which are incorporated herein by reference in their entireties.

FIELD

The present disclosure generally relates to stands for interface devices and more particularly to a devices for removably mounting point of sale devices, such as a credit card or bank terminal, such that the interface device is moveable during use.

BACKGROUND

The Background and Summary are provided to introduce a foundation and selection of concepts that are further described below in the Detailed Description. The Background and Summary are not intended to identify key or essential features of the claimed subject matter, nor are they intended to be used as an aid in limiting the scope of the claimed subject matter.

There has been widespread effort in recent years to accommodate persons with disabilities in public places. Many of these efforts have been directed toward assuring equal opportunities, full participation, independent living and economic self-sufficiency for persons with disabilities.

SUMMARY

One embodiment of the present disclosure generally relates to a device configured to removably mount an interface device, such as a point of sale terminal. The device of the present disclosure includes an anchor portion with a base that is configured to anchor the device. A carriage support member with an upper section and a lower section is connected to the anchor portion. The carriage support member has a first connecting feature. A carriage with an upper side and a lower side is configured to be positioned on the upper section of the carriage support member and is configured to support an interface device that may be operational as a point of sale terminal on the upper side. The carriage has a second connecting feature that is engageable with the first connecting feature of the carriage support member to removably connect the carriage to the carriage support member.

Another embodiment relates to a device configured to removably mount an interface device such as a point of sale terminal. The device includes an anchor portion having a base that is configured to anchor the device. A link with a first end opposite a second end is coupled to the base at the second end. A carriage support member having an upper section and a lower section is coupled to the first portion of the link. A lock control member having a first end and a second end is moveably coupled to the carriage support member and has a lower locking feature coupled to the second end. A carriage having an upper side and a lower side is configured to support an interface device that may be operational as a point of sale terminal on the upper side. The lower side of the carriage has an upper locking feature that is engageable with the lower locking feature to couple the carriage to the carriage support member. A release handle is coupled to the first end of the lock control member and is configured to be moveable by a user. Moving the release handle causes the upper locking feature to disengage with the lower locking feature such that the carriage is removable from the carriage support member.

Another embodiment relates to a method for removably mounting an interface device such as a point of sale terminal. The method includes the steps of anchoring a base of an anchor portion and coupling a link to the base, where the link has a first portion and a second portion that is opposite the first portion and the second portion is coupled to the base. The method further includes coupling the first portion of the link to a carriage support member that has an upper section and a lower section, where the lower section is coupled to the link. The method further includes providing a lock control member with a first end and a second end, coupling a lower locking feature to the second end, and coupling a release handle defining a release handle opening therein to the first end. The release handle opening is configured to receive a finger of a user. The method further includes providing a carriage with an upper side and a lower side, where the upper side is configured to support an interface device that may be operational as a point of sale. The lower side of the carriage has an upper locking feature and the upper locking feature and the lower locking feature of the carriage support member are engageable. The method further includes moveably coupling the lock control member to the carriage support member, where in a locked position the second end causes the upper locking feature and the lower locking feature to engage to removably couple the carriage and the carriage support member, and where moving the release handle such that the second end of the lock control member moves from the locked position to an unlocked position disengages the upper locking feature and the lower locking feature such that the carriage is removable from the carriage support member.

In another embodiment, a device is configured to removably mount a point of sale terminal. The device includes an anchor portion that has a base configured to anchor the device. A link with a first portion opposite a second portion is coupled to the base at the second portion. A carriage support member with an upper section and a lower section is coupled to the first portion of the link. The lower section of the carriage support member defines a lock aperture through the upper section and the lower section. A lock control member with a first end and a second end and defining a length axis therebetween is slideably coupled between the upper section and the lower section of the carriage support member. The lock control member is traditionally moveable relative to the carriage support member along the length axis and a lower locking feature is coupled to the second end. A carriage with an upper side and a lower side is configured to support an interface device operational as a point of sale terminal on the upper side. A lock projection extends perpendicularly away from the lower side of the carriage, which extends through the lock aperture of the carriage support member when the carriage is positioned on the carriage support member. The lock projection and the lower locking feature are engageable to removably couple the carriage and the carriage support member. A release handle defines a release handle opening therein that is configured to receive a finger of a user. The release handle is coupled to the first end of the lock control member such that moving the release handle disengages the lower locking feature and the lock projection so that the carriage is removable from the carriage support member.

Various other features, objects and advantages of the disclosure will be made apparent from the following description taken together with the drawings.

BRIEF DESCRIPTION OF THE DRAWINGS

The drawings illustrate the best mode presently contemplated of carrying out the disclosure. The same numbers are used throughout the drawings to reference like features and like components. In the drawings.

DETAILED DISCLOSURE

This written description uses examples to disclose embodiments of the present application, including the best mode, and also to enable any person skilled in the art to practice or make and use the same. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

One area that has continued to provide obstacles for persons with disabilities, particularly persons confined to wheel chair, is interfacing with mounted interface devices, for example, credit card terminals at check-out lanes in retail stores. Many retail stores use credit card terminals at check-out locations for their customers. The terminals are often mounted on check-out counters, and positioned at a height that is convenient for most consumers who are standing at the counters. For persons in wheel chairs, however, who are typically seated in their chairs, and positioned considerably lower than standing customers, the height of the terminals poses considerable difficulties. Such disabled persons often need the assistance of others when paying for the items they have purchased. It is sometimes necessary for others to insert the disabled person's credit card, or to enter private PIN numbers into a terminal. Often times, the only practical way for a person confined to a wheel chair to enter private PIN numbers is for the confined persons to reveal the private code to another person, who physically enters the numbers into the terminal interface.

Despite the widespread need for a device that more fully accommodates physically handicapped persons at these check-out locations, the problem has not been solved. Rather than positioning the payment devices at levels optimal for persons confined to wheel chairs, most stores have elected to position the devices at height levels that are convenient to persons who are physically able to stand at the check-out counters, the number of which greatly exceeds the number of wheel chair-bound customers. As a result, persons confined to wheel chairs have been forced to suffer the inconvenience and security risks of interacting, either directly or with the need for assistance of another person, with non-accommodating payment devices.

Figure 1:
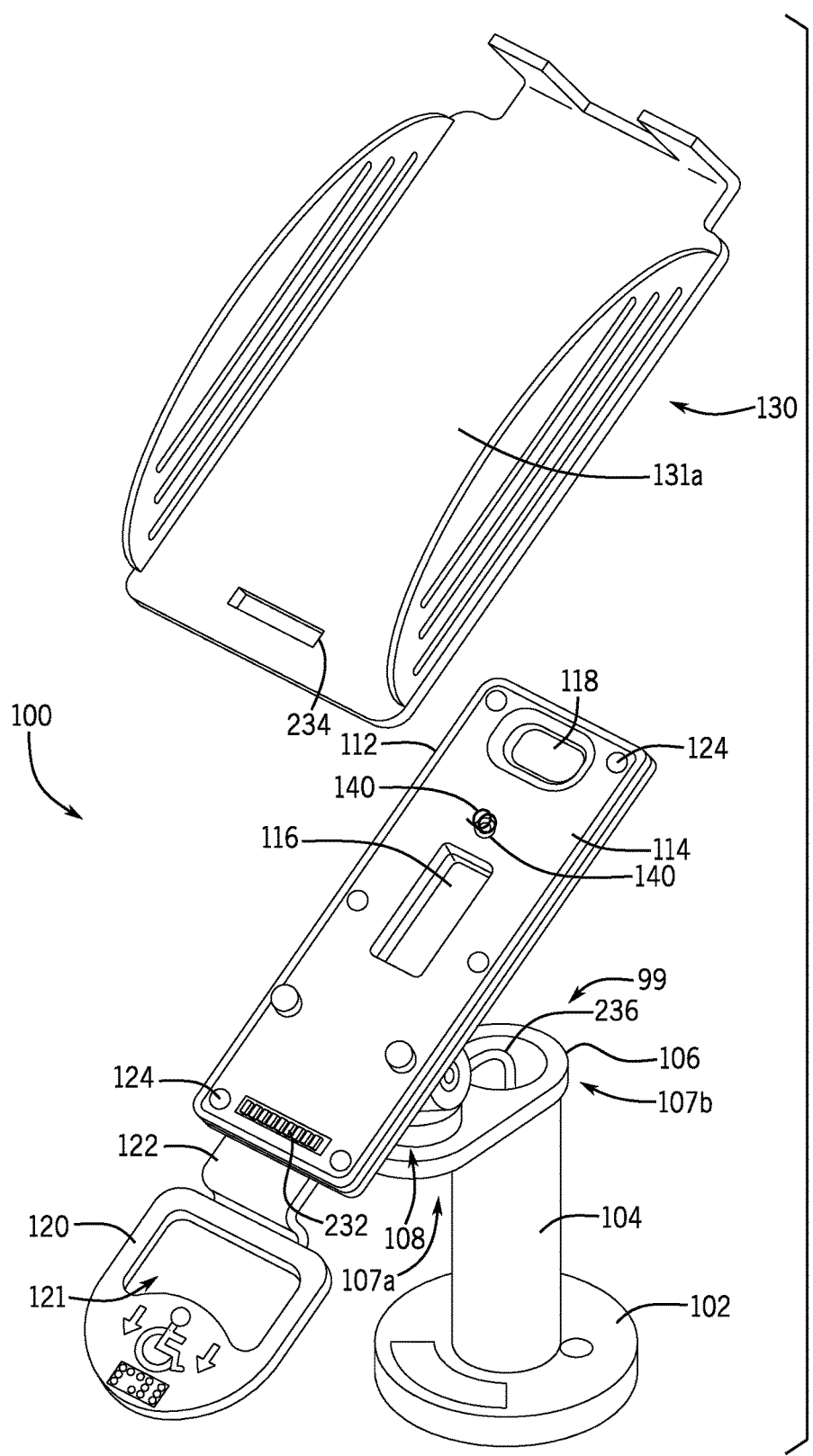
FIG. 1 is an perspective view of one embodiment of the presently disclosed device.
Figure 2:
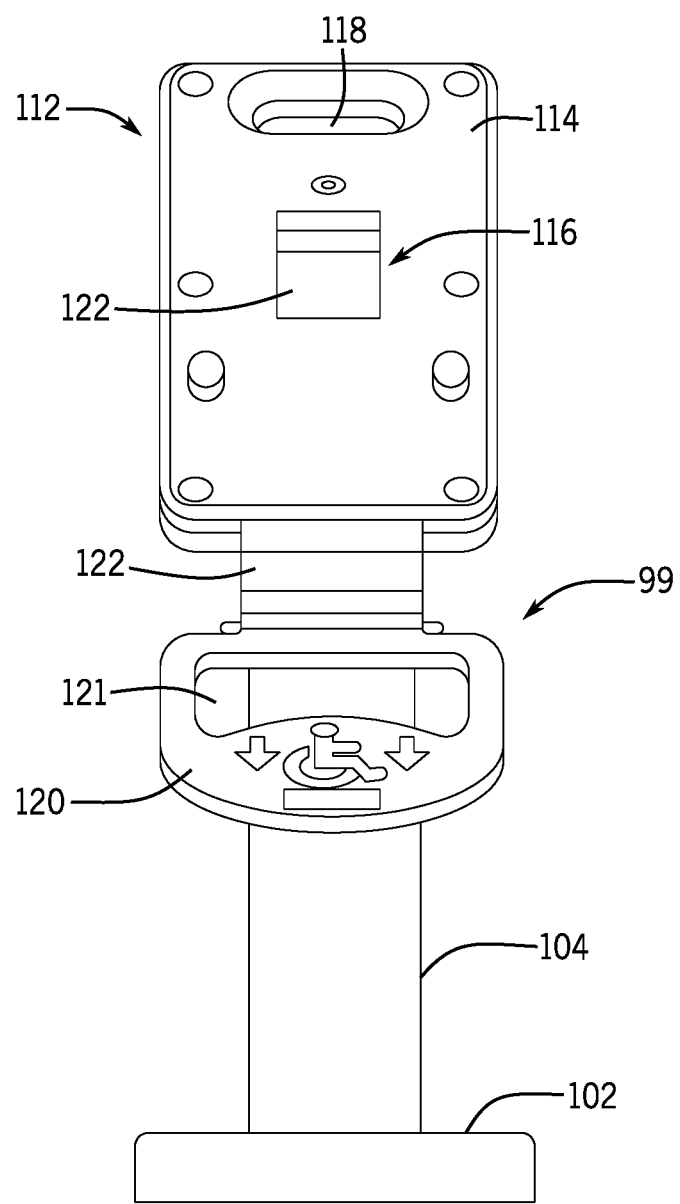
FIG. 2 is a front view of the receiver portion shown in FIG. 1.
Figure 3:
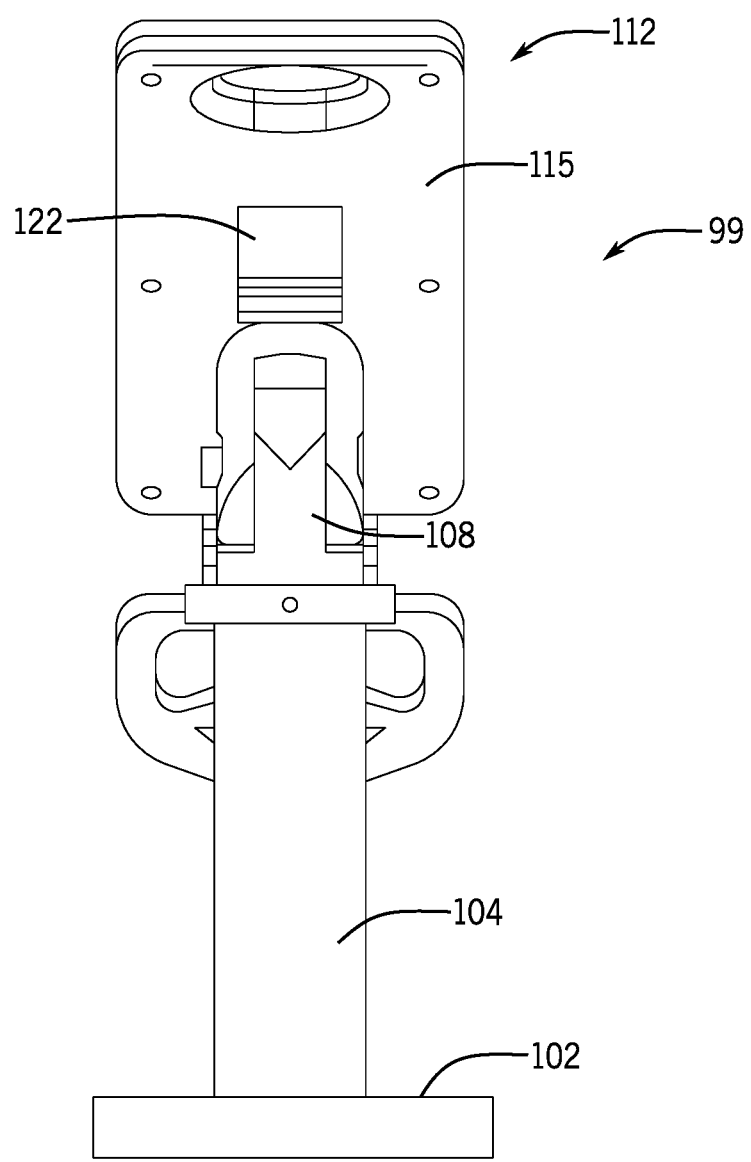
FIG. 3 is a rear view of the receiver portion shown in FIG. 1.

Referring now to the drawings, FIG. 1 shows one embodiment of a device 100 in accordance with the present disclosure. Specifically, the carriage 130 is shown removed from the receiver portion 99. The device 100 includes a base 102 having a circular configuration. The base 102 is adapted to be secured to a counter top or another object, for example, at a check-out location for a retail store to anchor the device 100. A columnar support member 104, having a cylindrical configuration in one embodiment, is provided in some embodiments, such as that shown in FIG. 1, but is not required (see FIG. 14). FIGS. 2 and 3 depict front and rear views of the same.

Figure 4:
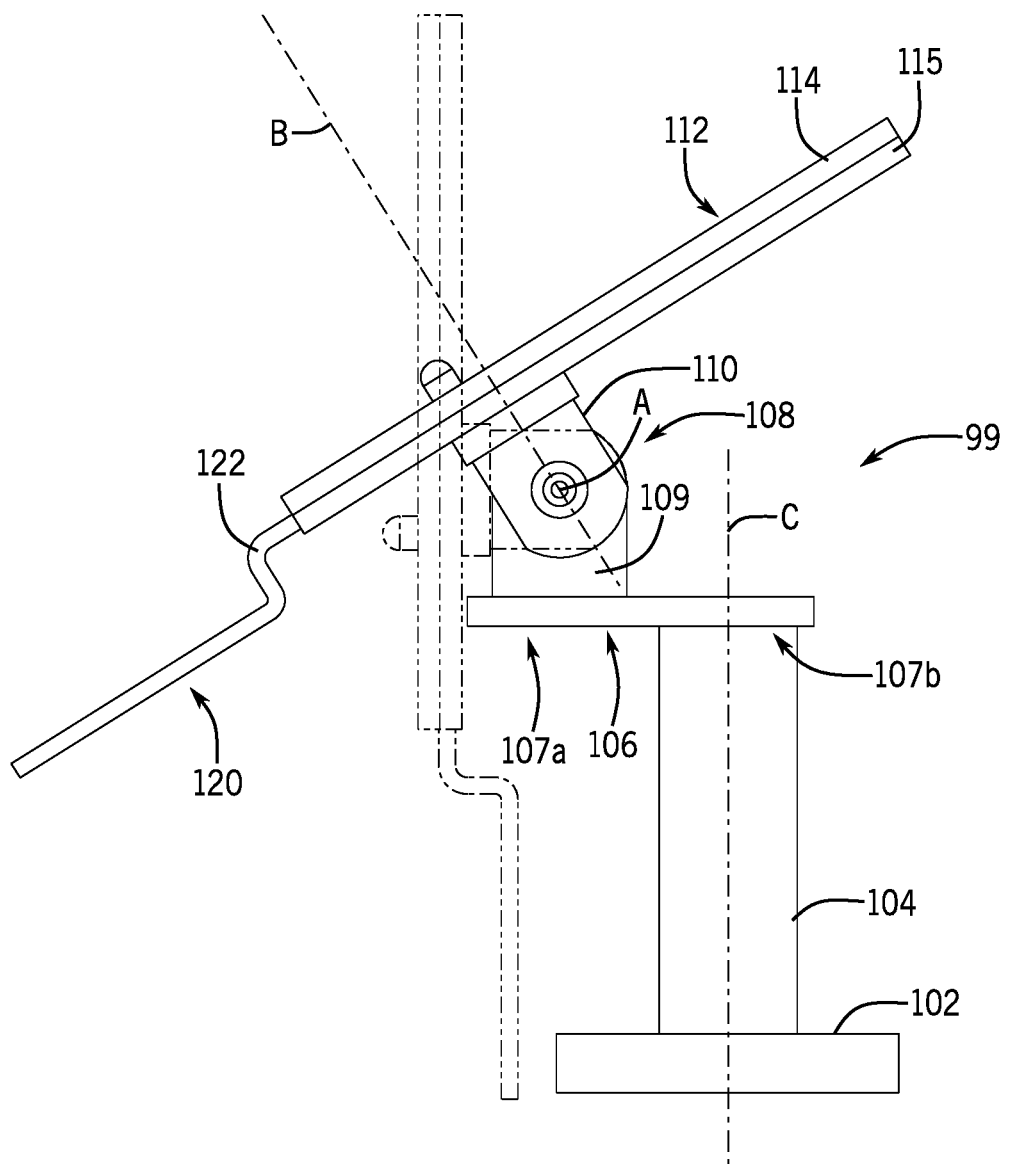
FIG. 4 is a side view of the receiver portion shown in FIG. 1.
Figure 5:
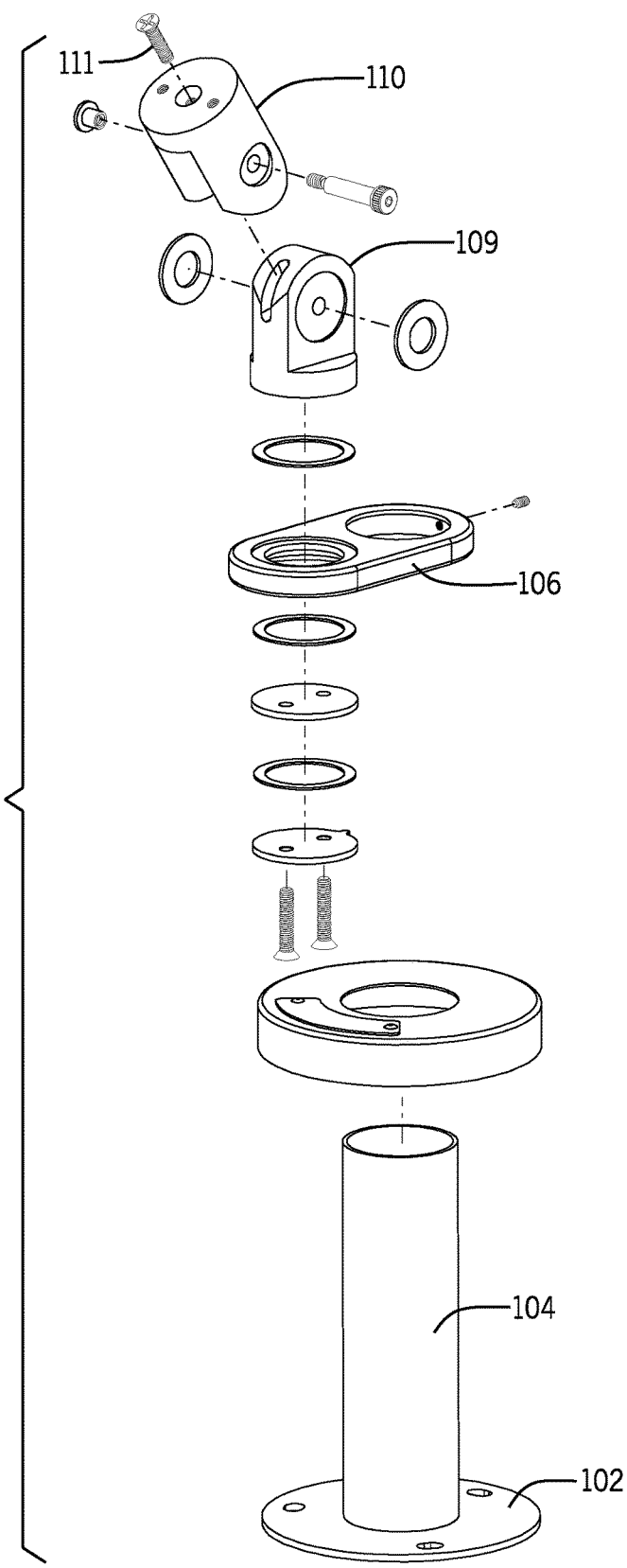
FIGS. 5 and 6 are exploded views of portions of the receiver portion shown in FIG. 1.

As shown in FIG. 4, the columnar support member 104, may extend upwardly from the center of the base 102. A link 106 having a first end 107a and a second end 107b may be rotatably mounted at the second end 107b to the top end of the columnar support member 104. If the link 106 is incorporated, the link 106 may extend radially outward from the axial center of the columnar support member 104 so that it may be coupled to a rotational assembly 108 at the first end 107a. In the embodiment shown, the rotational assembly 108 includes a first member 109 and a second member 110 that is rotatably attached to the first member 109 about tilt axis A. Other configurations of the rotational assembly 108, however, are contemplated to be within the scope of the present application. In addition, the device 100 provides rotation of the carriage support member 112 relative to the rotational assembly 108 about a twist axis B by virtue of pivot coupler 111 (see FIG. 5), as well as about turn axis C, and are discussed further below.

It should be recognized that the present disclosure also anticipates devices that do not have one or both of a link 106 or a rotational assembly 108. For example, the embodiment shown in FIG. 14 does not include link 106, in addition to not having a columnar support 104 as previously discussed. Likewise, other devices having additional links or rotational assemblies, or other additional structures, are also anticipated by the present disclosure.

Returning to FIG. 4, a carriage support member 112, having a generally rectangular configuration in one embodiment, is coupled to the second member 110 of the rotational assembly 108. In addition to the tilt axis A and twist axis B, the carriage support member 112 is movable relative to the base 102 about a turn axis C via rotation of the link 106 relative to the columnar support member 104. It should recognized that rotation about the turn axis C may also occur as relative movement between the columnar support member 104 and the base 102, such as in configurations where the link 106 and the columnar support member 104 are rigidly coupled, or where no columnar support member 104 is present.

Figure 11:
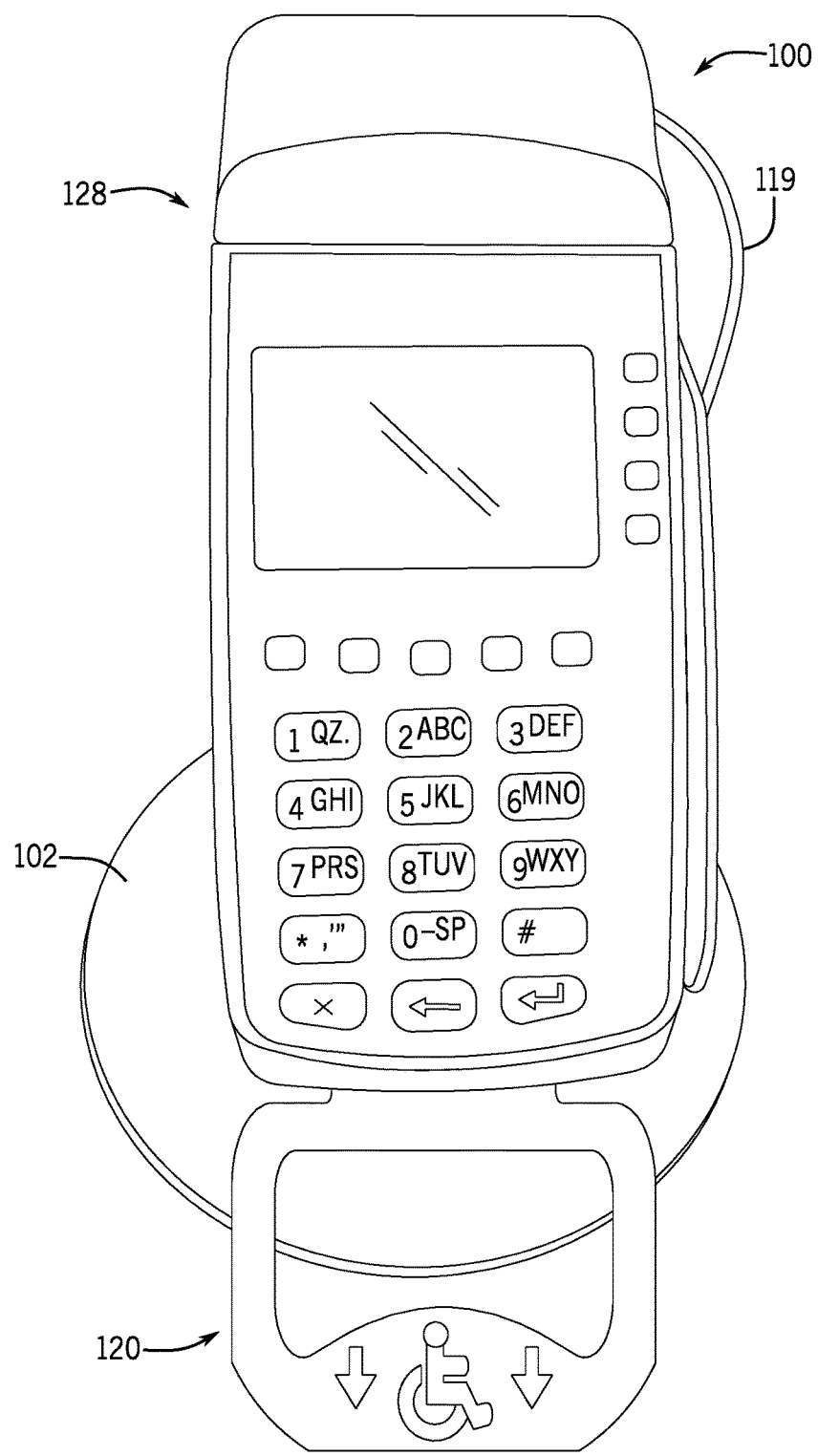
FIG. 11 is a top perspective view of the device shown in FIG. 10.
Figure 12:
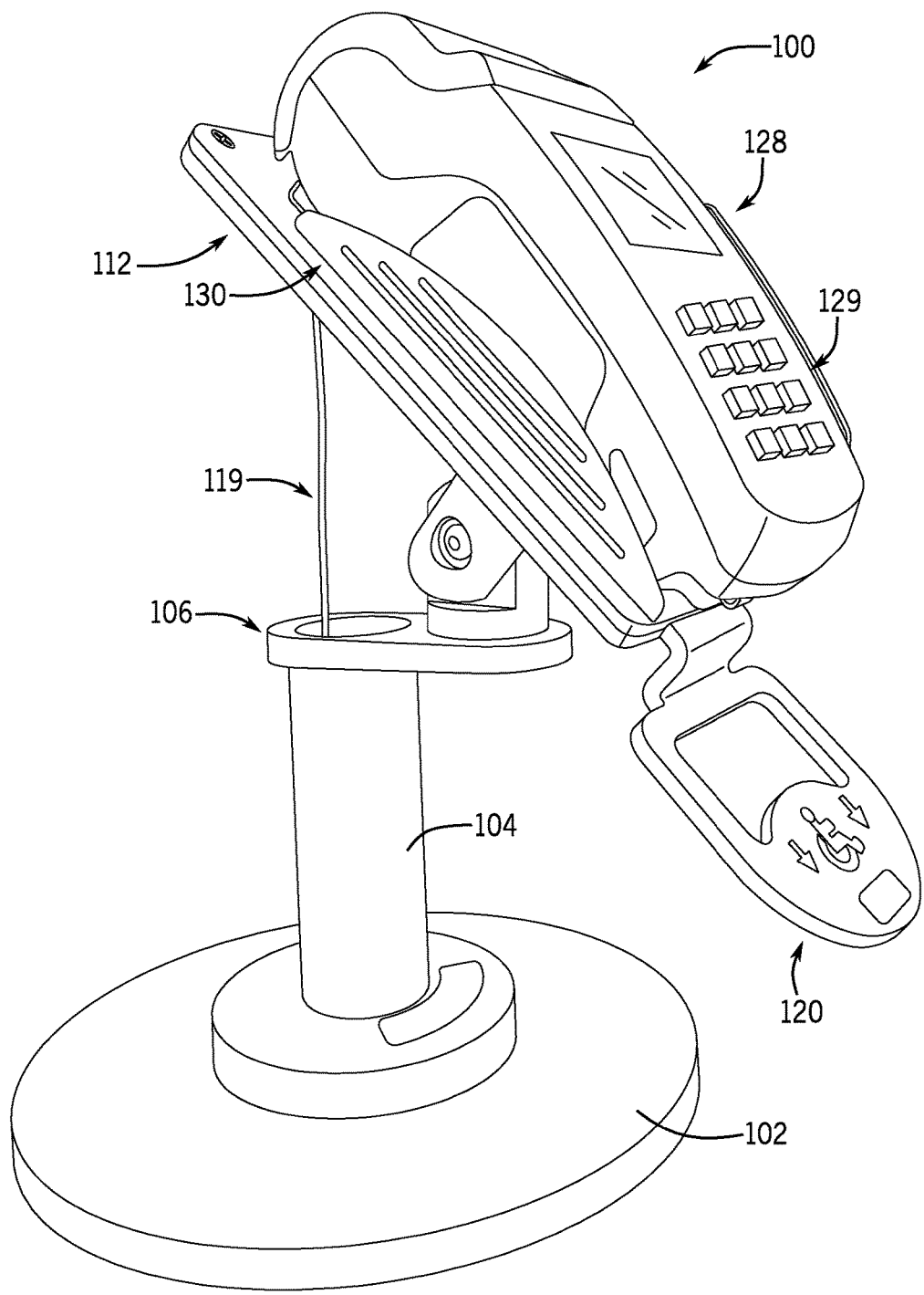
FIG. 12 is a perspective view of the device shown in FIG. 10.

In the embodiment of FIGS. 1 and 4, the carriage support member 112 has an upper section 114 that forms a substantially planar surface. As shown in FIG. 1, a lock aperture 116 extends through a central portion of the carriage support member 112 through both the upper section 114 and a lower section 115 that is opposite the upper section 114. An auxiliary aperture 118 also extends through the carriage support member 112 proximal to one end of the carriage support member 112. As shown in FIGS. 11-12, the auxiliary aperture 118 is configured such that a tether 119 can pass through to tie the interface device 128 to the base 102 or other portions of the device 100, such as to prevent loss or theft. Likewise, a power cord and/or data cable may be passed through the auxiliary aperture 118 to the interface device 128.

In the embodiment of FIG. 1, a release handle 120 is movably coupled to the carriage support member 112. In this exemplary embodiment, the release handle 120 defines a release handle opening 121 that is configured to receive one or more fingers of a user. With this configuration, the user can easily grab the release handle 120 without exerting a grip or pinch force to move the release handle 120 with little effort. This design is preferable by ADA standards.

The release handle 120 may extend from the first end 123a of a lock control member 122. A second end 123b of the lock control member 122, which in the present embodiment also forms a lower locking feature, extends into the carriage support member 112. It should be recognized that in other embodiments, a separate lower locking feature is coupled to or fabricated with the second end 123b. Likewise, the release handle opening 121 may be of a shape, size, or configuration different than the exemplary embodiments shown herein. Moreover, the release handle opening 121 need not be surrounded on all sides by the release handle 120, as shown in the embodiment of FIG. 16C.

Figure 6:
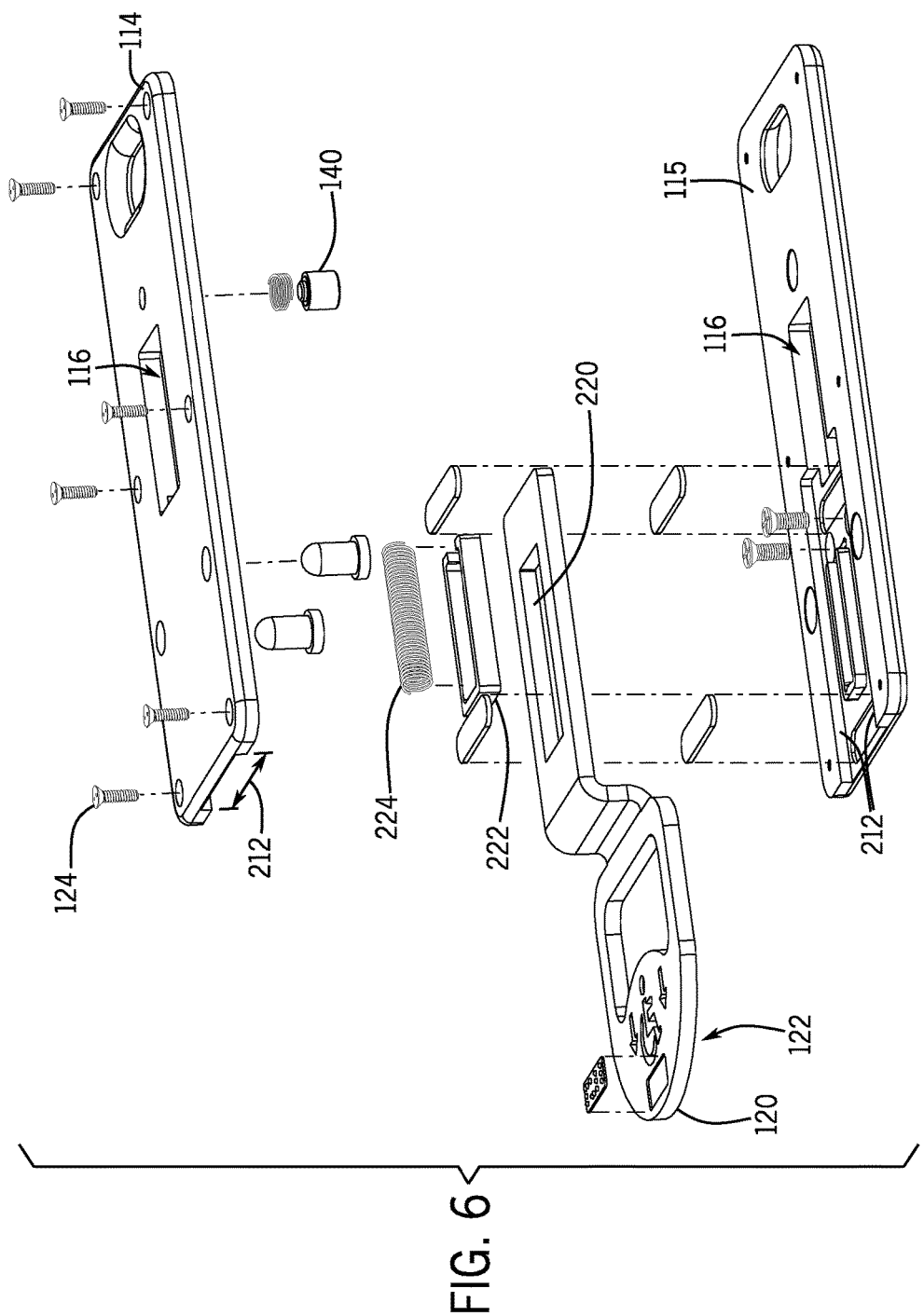
Figure 7:
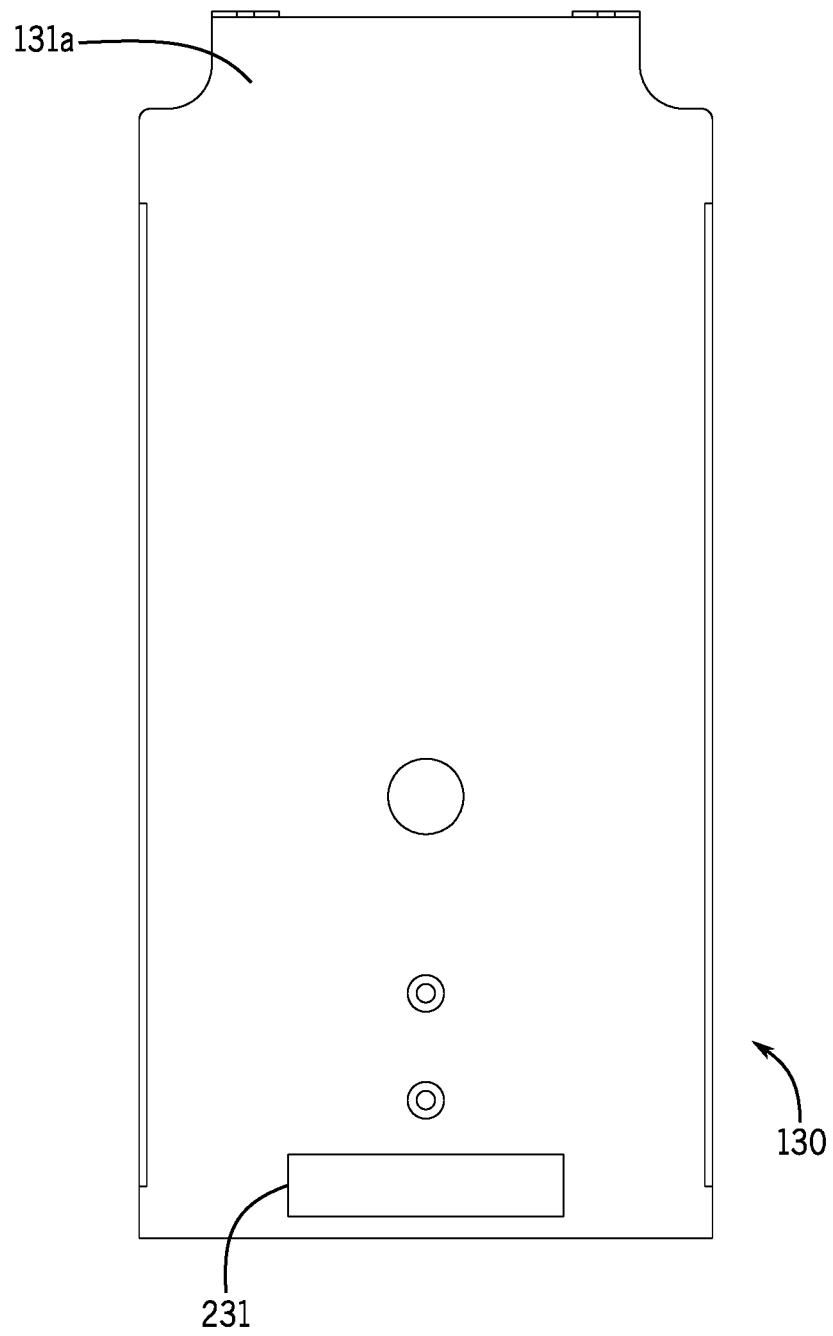
FIG. 7 is a perspective view of one embodiment of a carriage in accordance with the present disclosure.

As previously described and shown in FIGS. 1 and 6, the carriage support member 112 may be formed of an upper section 114 and a lower section 115 that are secured together by a plurality of screws 124. The upper section 114 of the carriage support member 112 includes a pair of outwardly extending bosses 126 that cooperate with complementary shaped and sized openings on the lower side 131b of a carriage 130 to align the carriage 130 on the carriage support member 112, which is described further below.

Figure 10:
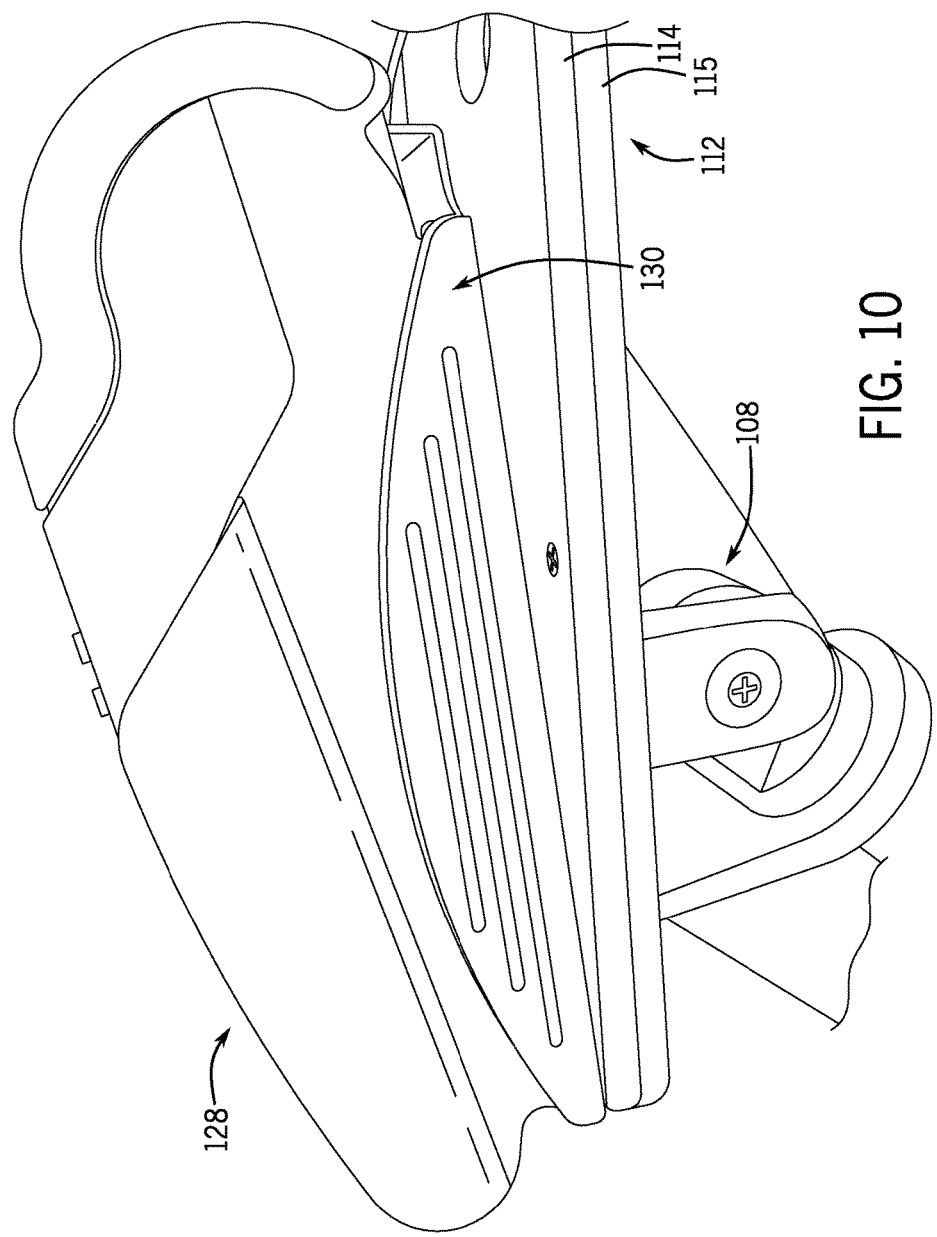
FIG. 10 is a perspective view of an interface device connected to one embodiment of the presently disclosed device.
Figure 13:
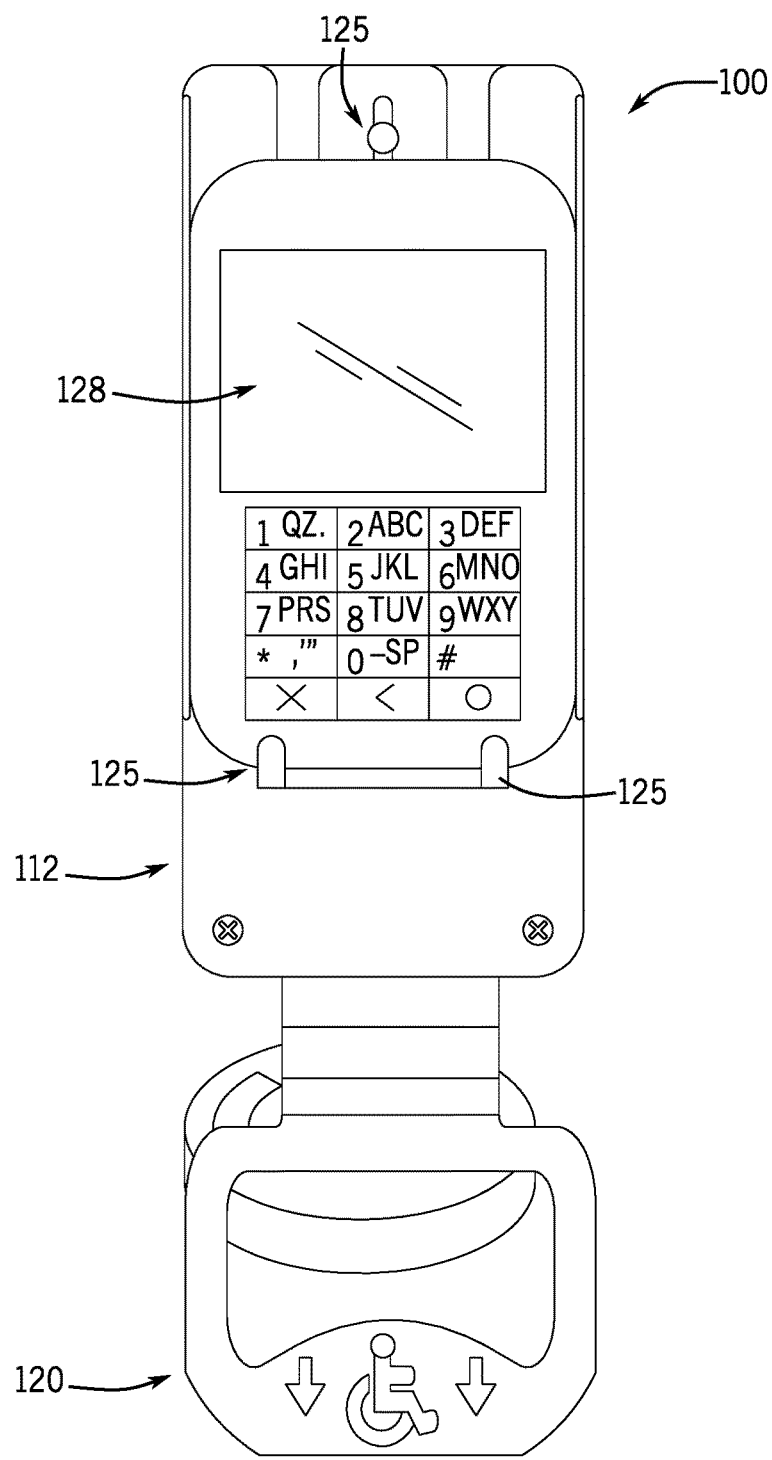
FIG. 13 is a top perspective view of another interface device connected to the device shown in FIG. 10.

Referring now to FIG. 10, an interface device 128, specifically illustrated as a credit card terminal, is shown mounted on the upper side 131a of the carriage 130. FIGS. 11-12 show top and side views of one such an interface device 128 installed on the presently disclosed device 100. One alternative version of an interface device 128 is also shown in FIG. 13, though many others are compatible with the presently disclosed device 100. The embodiment of FIG. 13 uses retention devices 125 to provide or aid in this mounting of the interface device 128 and carriage 130. It should be noted that in the present disclosure, mounting, connecting, coupling, installing, and other synonyms should be interpreted to have the broadest definitions supported.

Figure 8:
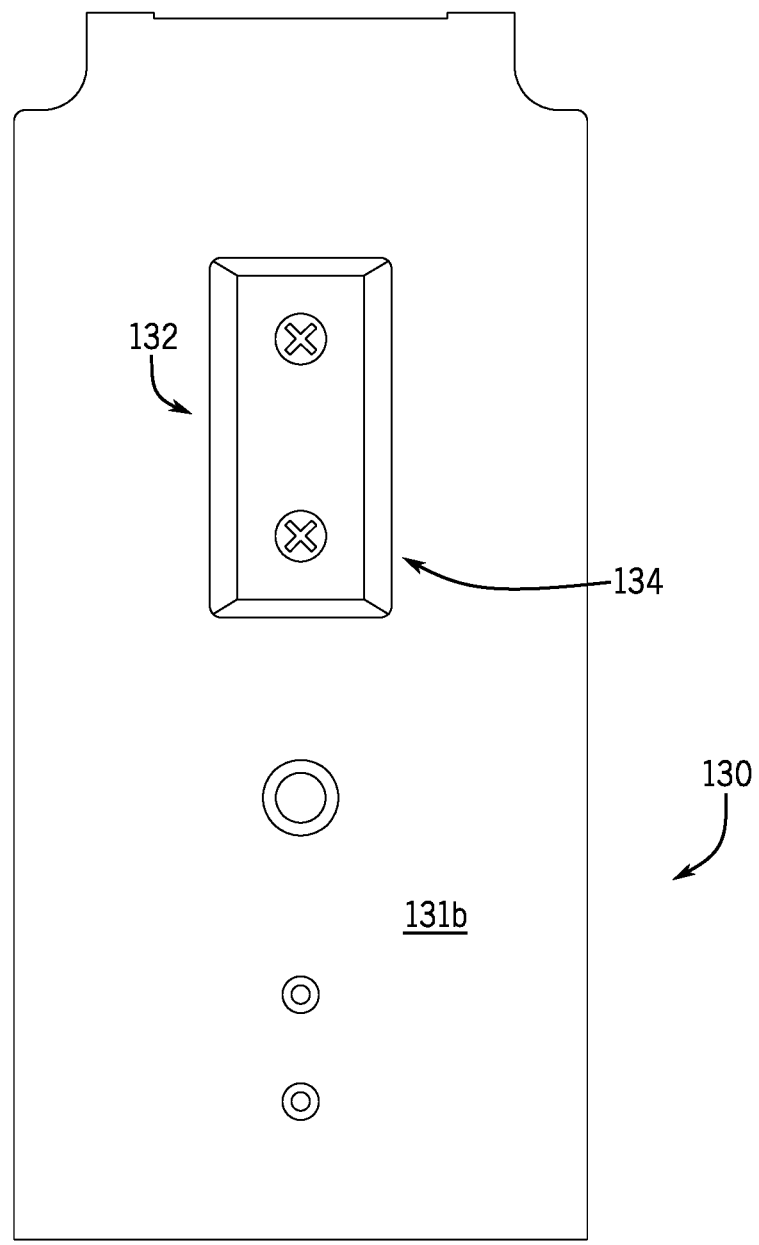
FIG. 8 is a bottom view of the carriage shown in FIG. 7.
Figure 9:
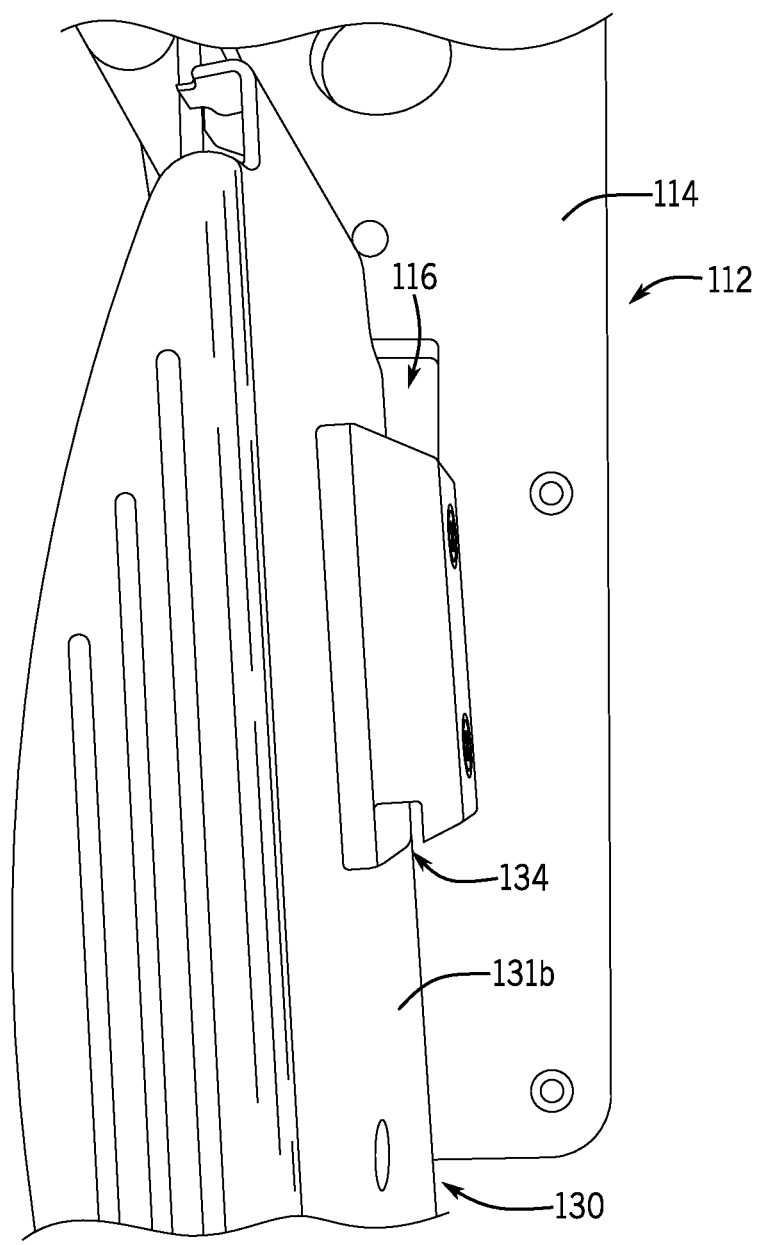
FIG. 9 is a side, perspective view of the carriage shown in FIG. 7.

Returning to FIG. 10, the carriage 130 is shown positioned in close proximity to the upper section 114 of the carriage support member 112. The lower side 131b of the carriage 130 is shown in FIGS. 8-10. These Figures further depict an upper locking feature 132, shown here as a projection extending away from the lower side 131b of the carriage 130. The upper locking feature 132 is sized and configured to fit within the lock aperture 116 when the lower side 131b of the carriage 130 is positioned on the upper section 114 of the carriage support member 112. In the embodiment shown in FIG. 9, one end of the upper locking feature 132 has a slot 134 to engage with a lower locking feature.

In other embodiments, the upper locking feature 132 moveably couples the carriage 130 to the carriage support member 112 without a lower locking feature or lock control member 122 simply through engagement of the upper locking feature 132 and the lock aperture 116.

It should be recognized that while the previously discussed embodiments incorporate a carriage 130 that is distinct from the interface device 128 to be mounted thereon, alternate embodiments may integrally incorporate the carriage 130 into the base of an interface device 128 for more directly coupling the interface device 128 to the carriage support member 112. However, providing a carriage 130 separately from the interface device 128 is advantageous in that the device 100 can then be retrofitted to accommodate a wide variety of existing interface devices 128, reducing the cost of implementing the presently disclosed device 100 to attain ADA-compliance.

In the embodiment shown in FIG. 6, the lock control member 122 is slideably movable between the upper section 114 and lower section 115 of the carriage support member 112 through a pathway defined by guide surfaces 212 on opposite sides of the lock control member 122. The lock control member 122 may also include an internal guide aperture 220 through which a guide structure 222 may extend to guide the direction of the lock control member 112's movement relative to the carriage support member 112. A lock spring 224 may be incorporated to bias the lower locking feature, here the second end 123b of the lock control member 122, into the slot 134 (not shown). This locks the carriage 130 against the upper section 114 of the carriage support member 112. Although the lock spring 224 is shown here to be a spring, other mechanisms for biasing the lower locking feature would be known to those skilled in the art, and are contemplated as being within the scope of the present disclosure.

Figure 16A:
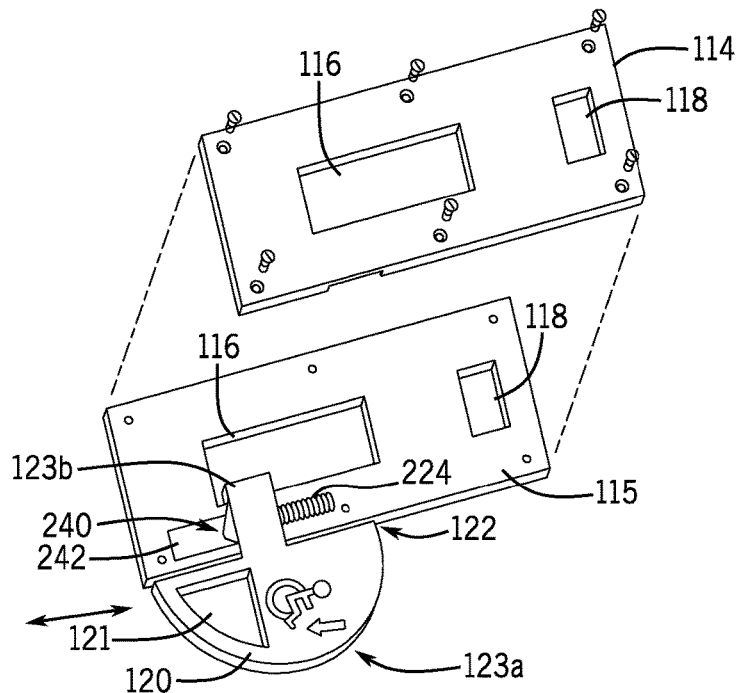
FIGS. 16A-16E depict partial views of alternative embodiments of devices in accordance with the present disclosure.
Figure 16B:
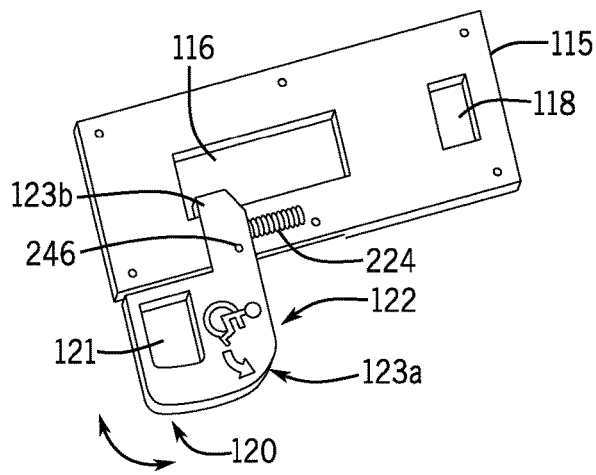
Figure 16C:
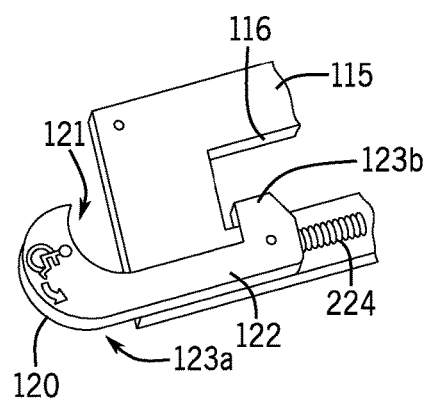

In other embodiments, such as those shown in FIGS. 16A-16C, the lock control member 122 is moveable in different ways and through different structures. In the embodiment of FIG. 16A, the lock control member 122 is translationally moveable relative to the carriage support member 112 as with the embodiment shown in FIG. 6. However, the embodiment of FIG. 16A provides this translational moveability using a slide notch 240 on the lock control member 122 that moves within a slide groove 242, shown here to be within the lower section 115. Here, a lock spring 224 biases the lock control member 122 into engagement with the upper lock feature 132, such as via a slot 134 therein.

In contrast, FIGS. 16B and 16C provide embodiments whereby the lower locking feature, shown here as the second end 123b of the lock control member 122, is rotatably moveable relative to the lower section 115. In each case, the lock spring 224 biases the second end 123b into engagement with the upper locking feature 132 as previously described.

It should be recognized that while the previous examples primarily focus on the upper locking feature 132 and the lower locking feature, such as the second end 123b of the lock control member 122, engaging by use of a slot 134, other locking structures would be known to those skilled in the art. For example, the lock control member 122 can engage a hole within the upper locking feature 132, the slot 134 could be within the second end 123b of the lock control member 122 instead of within the upper locking feature 132, or other variations, all of which are contemplated as being within the scope of the present disclosure.

Figure 16D:
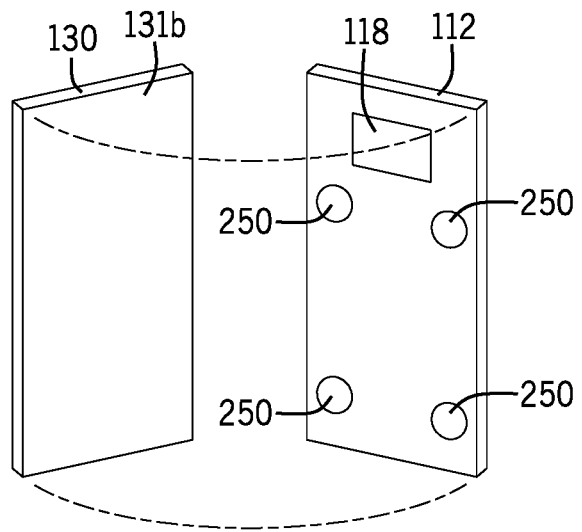
Figure 16E:
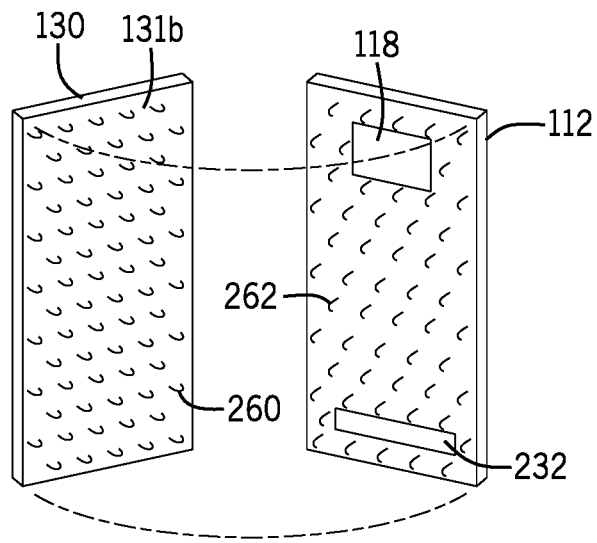

Still further embodiments do not incorporate a lock aperture 116 within the carriage support member 112 and lock control member 122, but instead removably couple the carriage 130 to the carriage support member 112 without translational or rotational engagement. In certain embodiments, this includes the use of a first connecting feature and a second connecting feature that are removably engageable in place of the upper locking feature and lower locking feature of other embodiments. For example, the embodiment of FIG. 16D discloses a plurality of magnets 250 coupled to the upper section 114 of the carriage support member 112. The plurality of magnets 250 are configured to magnetically couple with the lower side 131b of the carriage 130. Similarly, FIG. 16E discloses an embodiment having corresponding hook 260 and loop 262 structures on the upper section 113 and lower side 131b for similar, removable coupling therebetween. The embodiments of FIGS. 16D and 16E are advantageous in that the carriage support member 112 does not require guide surfaces 212, slide grooves, or other machined or formed openings between the upper section 114 and lower section 115 to accommodate a lock control member 122. This provides cost savings in producing the carriage support member 112 and by eliminating the need and complexity of a lock control member 122.

As previously described and shown in FIGS. 10-14, the device 100 may support an interface device 128, such as the illustrated credit card reader, in an operative position above a check-out counter. For transactions by persons in a standing position at the counter, the device 100 can be rotated about its tilt axis A, twist axis B, and/or turn axis C, and/or can be moved translationally via the link 106, and/or up and down via an telescoping version of the columnar support member 104 (not expressly shown) to alter the position at the convenience of the consumer (see FIG. 4). As one of ordinary skill would be recognized, the presently disclosed device 100 is also operable with a gooseneck connection between the base 102 and the carriage support member 112 to provide positioning flexibility. The gooseneck connection may be incorporated in place of or in addition to the columnar support member 104, link 106, and/or rotational assembly 108 depending on the particular application and the interface device 128 being used.

In each of these previously discussed embodiments, the carriage 130 and the interface device 128 contained thereon remains separable from the carriage support member 112. In this regard, the device 100 provides that the interface device 128 is moveable to another position off of the receiver 99, for example where it can be used by a consumer sitting in a wheel chair. It should be recognized that using the interface device 128 separately from the device 100 can also be advantageous in other applications, such as drive-thru windows accommodating vehicles of different heights and sizes.

In the embodiment shown in FIGS. 11-13, separation of the carriage 130 and carriage support member 112 is achieved by pulling the release handle 120. Pulling the release handle 120 is operative to slide the lock control member 122, and specifically the lower locking feature formed by the second end 123b, out of the slot 134 in the upper locking feature 132. With the second end 123b removed from the slot 134, an ejection spring 140 (as seen in FIG. 6) urges the carriage 130 away from the upper section 114, as illustrated in FIG. 10. With the lock control member 122 no longer securing the carriage 130 to the carriage support member 112, the carriage 130 and interface device 128 carried thereby becomes movable, for example to the lap of a wheel chair bound consumer. This allows the wheel chair bound consumer to interact with the interface device 128 with far greater convenience than conventional credit card terminals, including allowing the consumer to complete the sales transaction without the assistance of another person.

Figure 14:
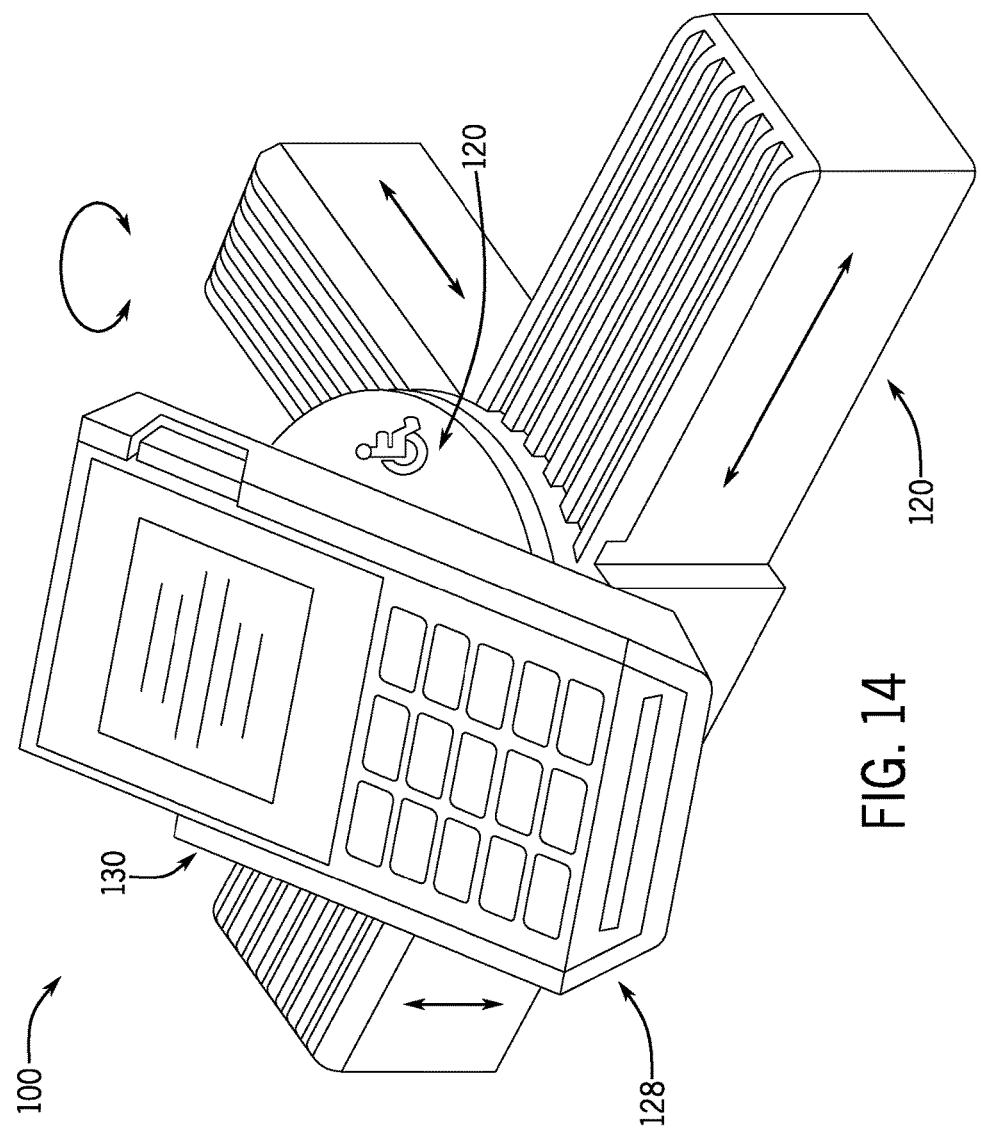
FIG. 14 is a perspective view of another embodiment of device in accordance with the present disclosure.

FIG. 14 shows an interface device 128 mounted in an embodiment of the device 100 resembling a handicap-accessible docking station. The interface device 128 shown is secured to a carriage 130 that is locked to a carriage support member 112 in one of the manners previously described. The release handle 120 may be slidable movable via the slide notch 240 within slide groove 242 in the lower section 115 to disengage the second end 123b or other lower locking feature as shown in FIG. 16A. However, the present disclosure anticipates other configurations for disengaging the second end 123b or other lower locking feature, such as that shown in FIG. 16B with rotational movement about a pivot axis at coupler 246.

Figure 15:
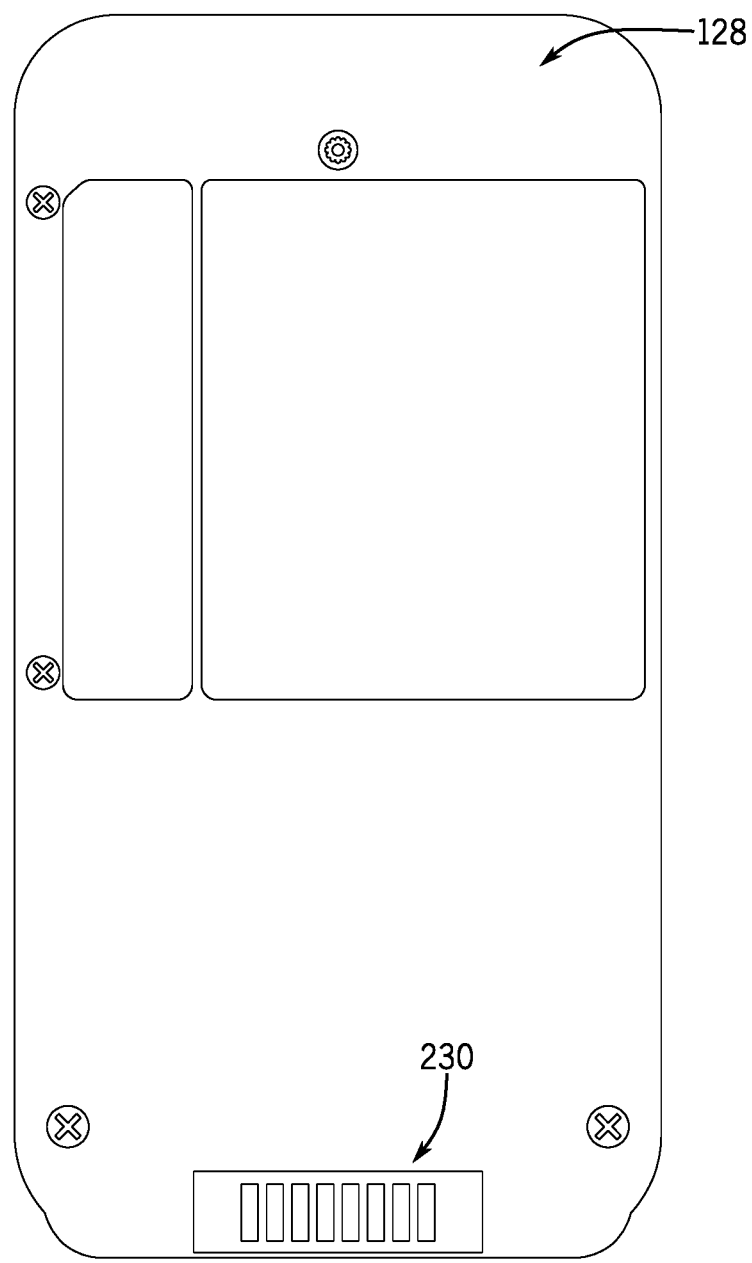
FIG. 15 is a bottom view of the interface device shown in FIG. 13.

As shown in FIG. 15, the interface device 128 has a plurality of interface electrical contacts 230, which contact corresponding fixed electrical contacts 232 on the upper section 114 of the carriage support member 112 (see FIG. 1) to charge the interface device 128 while it is in the docking station. In certain embodiments, such as that shown in FIG. 1, the carriage 130 has an opening 234 to allow contact between the plurality of interface electrical contacts 230 and the plurality of fixed electrical contacts 232. A cable 236 then provides a connection between the plurality of fixed electrical contacts 232 and other external point of sale equipment.

It should be recognized that the plurality of interface electrical contacts 230 and fixed electrical contacts 232 are applicable to any of the previously described embodiments. In this regard, the interface device 128 may either communicate with other point of sale equipment wirelessly, such as using Bluetooth® or NFC technology, or may store transaction information until the interface device 128 is reconnected with the carriage support member 112. Alternatively, some embodiments permit the interface device 128 to be hard-wired to such point of sale equipment with power cords and/or data cables for wireless connectivity. For example, power and/or data may be handled through USB ports located on the device 100 and/or the carriage 130 in place of the plurality of interface electrical contacts 230, and corresponding fixed electrical contacts 232.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies described herein may be used alone or in combination with other devices. It is to be expected that various equivalents, alternatives and modifications are possible within the scope of any appended claims.

We claim:

1. A device configured to removably mount an interface device, the device comprising:

an anchor portion having a base that is configured to anchor the device;

a link having a first end opposite a second end, wherein the second end is coupled to the base;

a carriage support member having an upper section and a lower section, wherein the carriage support member is coupled to the first portion of the link;

a lock control member having a first end and a second end, wherein the second end of the lock control member is sandwiched between the upper section and the lower section of the carriage support member, wherein the lock control member is moveably coupled to the carriage support member, and wherein a lower locking feature is coupled to the second end;

a carriage having an upper side and a lower side, wherein the carriage is configured to support the interface device on the upper side, wherein the lower side of the carriage has an upper locking feature, wherein the upper locking feature is engageable with the lower locking feature to removably couple the carriage to the carriage support member; and a release handle coupled to the first end of the lock control member, wherein the release handle is configured to be moveable by a user, and wherein moving the release handle causes the upper locking feature to disengage with the lower locking feature such that the carriage is removable from the carriage support member.

2. The device according to claim 1, wherein at least a portion of the lower side of the carriage is ferrous, wherein the first connecting feature is a plurality of magnets, and wherein the second connecting feature is the portion of the lower side that is ferrous.

3. The device according to claim 1, wherein the release handle defines a release handle opening therein, wherein the release handle opening is configured to receive at least one finger of a user.

4. The device according to claim 1, wherein the release handle defines a release handle plane, wherein the interface device has a top surface that defines an interface device plane, and wherein the release handle plane and the interface device plane are substantially parallel.

5. The device according to claim 1, wherein the lock control member defines a length axis between the first end and the second end, and wherein the lock control member is translationally moveable relative to the carriage support member along the length axis.

6. The device according to claim 1, wherein the lock control member has a pivot axis located between the first end and the second end, and wherein the lock control member is rotationally moveable relative to the carriage support member about the pivot axis.

7. The device according to claim 6, wherein the lock control member defines a length axis between the first end and the second end, and wherein the pivot axis is perpendicular to the length axis.

8. The device according to claim 1, wherein the carriage support member defines a lock aperture though the upper section and the lower section, wherein the upper locking feature is a projection that extends away from the lower side of the carriage, and wherein the projection extends through the lock aperture when the carriage is positioned on the carriage support member.

9. The device according to claim 8, wherein the upper locking feature further defines a slot within the projection, wherein the lower locking feature is movable into the slot to engage with the upper locking feature, and wherein when the lower locking features is engaged within the slot the projection is retained within the lock aperture.

10. The device according to claim 9, further comprising a lock spring that biases the lower locking feature into the slot, wherein moving the release handle opposes the lock spring bias.

11. The device according to claim 1, wherein the upper locking feature and the lower locking feature automatically engage when the carriage is positioned on the carriage support member.

12. The device according to claim 1, further comprising an ejection spring that extends away from the upper section of the carriage support member, wherein the ejection spring biases the carriage away from the carriage support member.

13. The device according to claim 1, further comprising a rotational assembly that pivotally couples the link and the carriage support member.

14. The device according to claim 13, wherein the upper section of the carriage support member defines a carriage support member plane, wherein the link defines a link plane, wherein the rotational assembly has a first member and a second member that are pivotably coupled at a tilt axis that is parallel to the carriage support member plane and parallel to the link plane, and wherein the carriage support member is pivotable relative to the link about the tilt axis.

15. The device according to claim 14, wherein the rotational assembly further provides a turn axis that is perpendicular to the carriage support member plane, wherein the carriage support member is further pivotable relative to the link about the turn axis.

16. The device according to claim 1, further comprising a plurality of fixed electrical contacts, wherein the plurality of fixed electrical contacts are configured to connect with a plurality of interface electrical contacts on the interface device when the carriage is coupled to the carriage support member.

17. The device according to claim 16, further configured such that a battery within the interface device is charged when the plurality of fixed electrical contacts are connected to the plurality of interface electrical contacts.

18. The device according to claim 1, wherein a columnar support is rotatably coupled between the base and the second end of the link.

19. A device configured to removably mount a point of sale terminal, the device comprising:

an anchor portion having a base that is configured to anchor the device;

a link having a first portion opposite a second portion, wherein the second portion is coupled to the base;

a carriage support member having an upper section and a lower section, wherein the carriage support member is coupled to the first portion of the link, and wherein the carriage support member defines a lock aperture through the upper section and the lower section;

a lock control member having a first end, a second end, and a length axis therebetween, wherein the lock control member is slideably coupled between the upper section and the lower section of the carriage support member, wherein the lock control member is translationally moveable relative to the carriage support member along the length axis, and wherein the second end has a lower locking feature;

a carriage having an upper side and a lower side, wherein the upper side is configured to support an interface device operational as a point of sale terminal, wherein a lock projection extends perpendicularly away from the lower side of the carriage, wherein the lock projection extends through the lock aperture of the carriage support member when the carriage is positioned on the carriage support member, and wherein the lock projection and the lower locking feature are engageable to removably couple the carriage and the carriage support member; and a release handle coupled to the first end of the lock control member, wherein the release handle defines a release handle opening therein that is configured to receive at least one finger of a user, and wherein moving the release handle disengages the lower locking feature and the lock projection such that the carriage is removable from the carriage support member.

20. A device configured to removably mount an interface device, the device comprising:

an anchor portion having a base that is configured to anchor the device;

a link having a first end opposite a second end, wherein the second end is coupled to the base;

a carriage support member having an upper section and a lower section, wherein the carriage support member is coupled to the first portion of the link;

a lock control member having a first end and a second end, wherein the lock control member is moveably coupled to the carriage support member, and wherein a lower locking feature is coupled to the second end;

a carriage having an upper side and a lower side, wherein the carriage is configured to support the interface device on the upper side, wherein the lower side of the carriage has an upper locking feature, wherein the upper locking feature is engageable with the lower locking feature to removably couple the carriage to the carriage support member; and a release handle coupled to the first end of the lock control member, wherein the release handle is configured to be moveable by a user, wherein the release handle defines a release handle opening therein, wherein the release handle opening is configured to receive at least one finger of the user, wherein the release handle defines a release handle plane, wherein the interface device has a top surface that defines an interface device plane, wherein the release handle plane and the interface device plane are substantially parallel, and wherein moving the release handle causes the upper locking feature to disengage with the lower locking feature such that the carriage is removable from the carriage support member.

21. The device according to claim 1, wherein the release handle defines a release handle opening therein, and wherein the release handle opening is configured to receive at least one finger of the user.

* * * * *